Oct. 6, 1936.  M. J. WEBER ET AL  2,056,546
WEIGHING MECHANISM
Filed Dec. 15, 1933    3 Sheets-Sheet 1
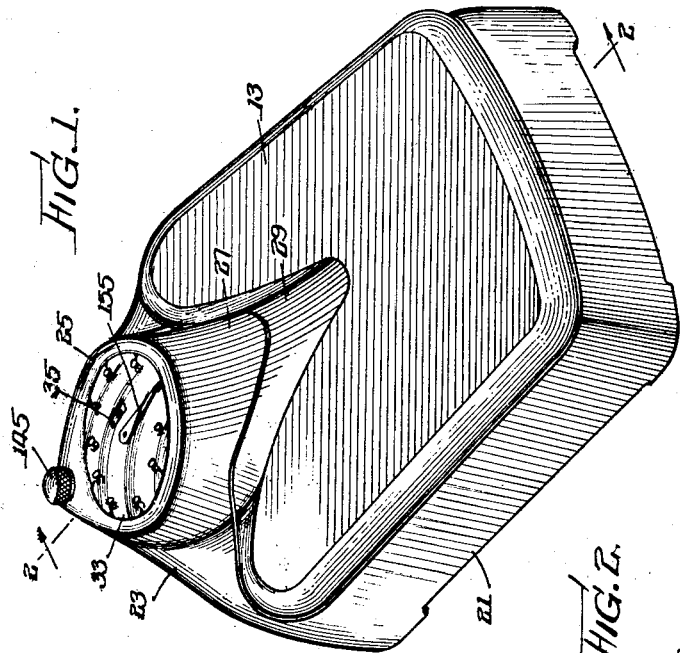
Inventors
Mathias J. Weber
Russell E. Vanderhoff
By: Cox & Moor  Attys

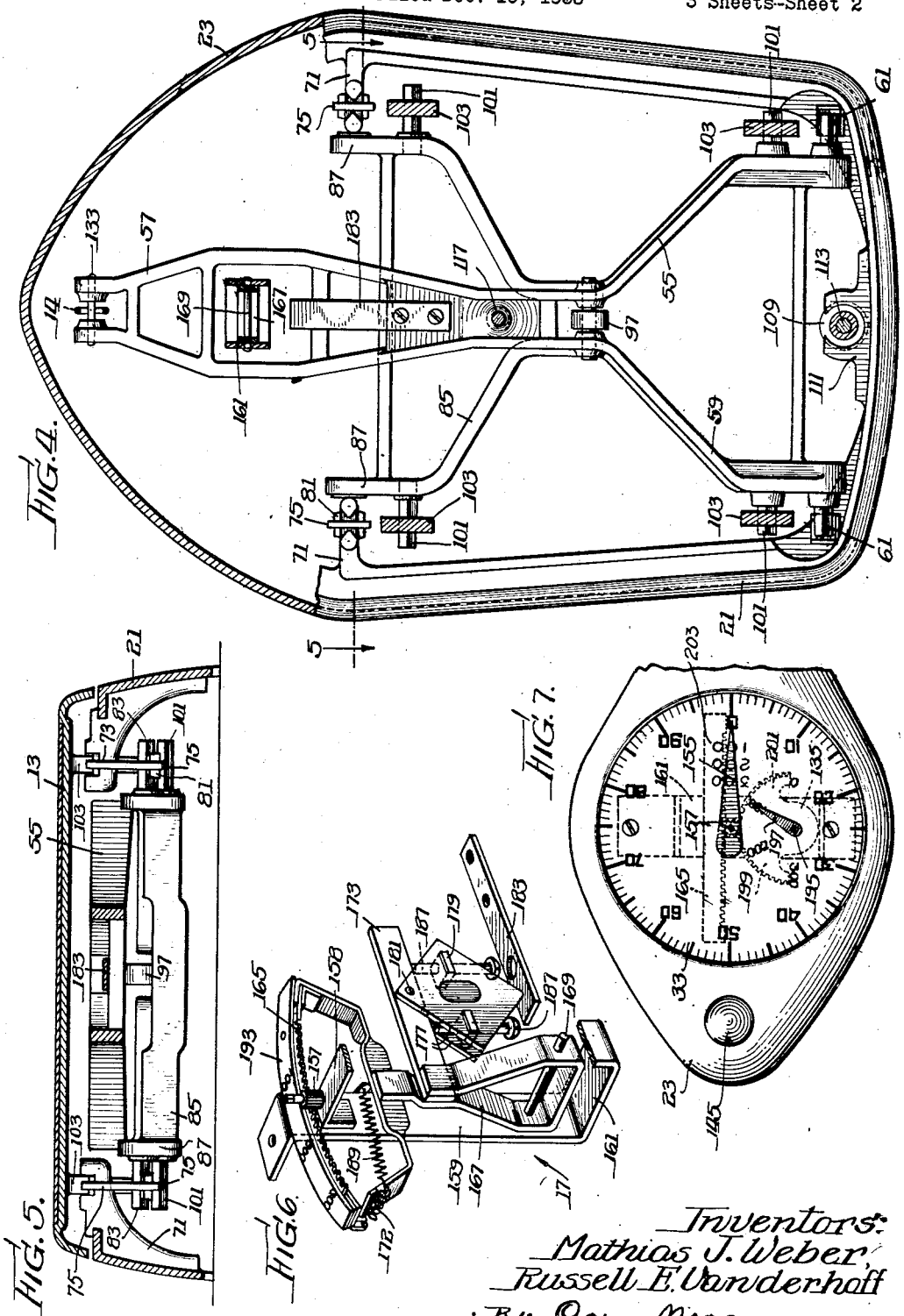

Oct. 6, 1936.  M. J. WEBER ET AL  2,056,546
WEIGHING MECHANISM
Filed Dec. 15, 1933   3 Sheets-Sheet 3
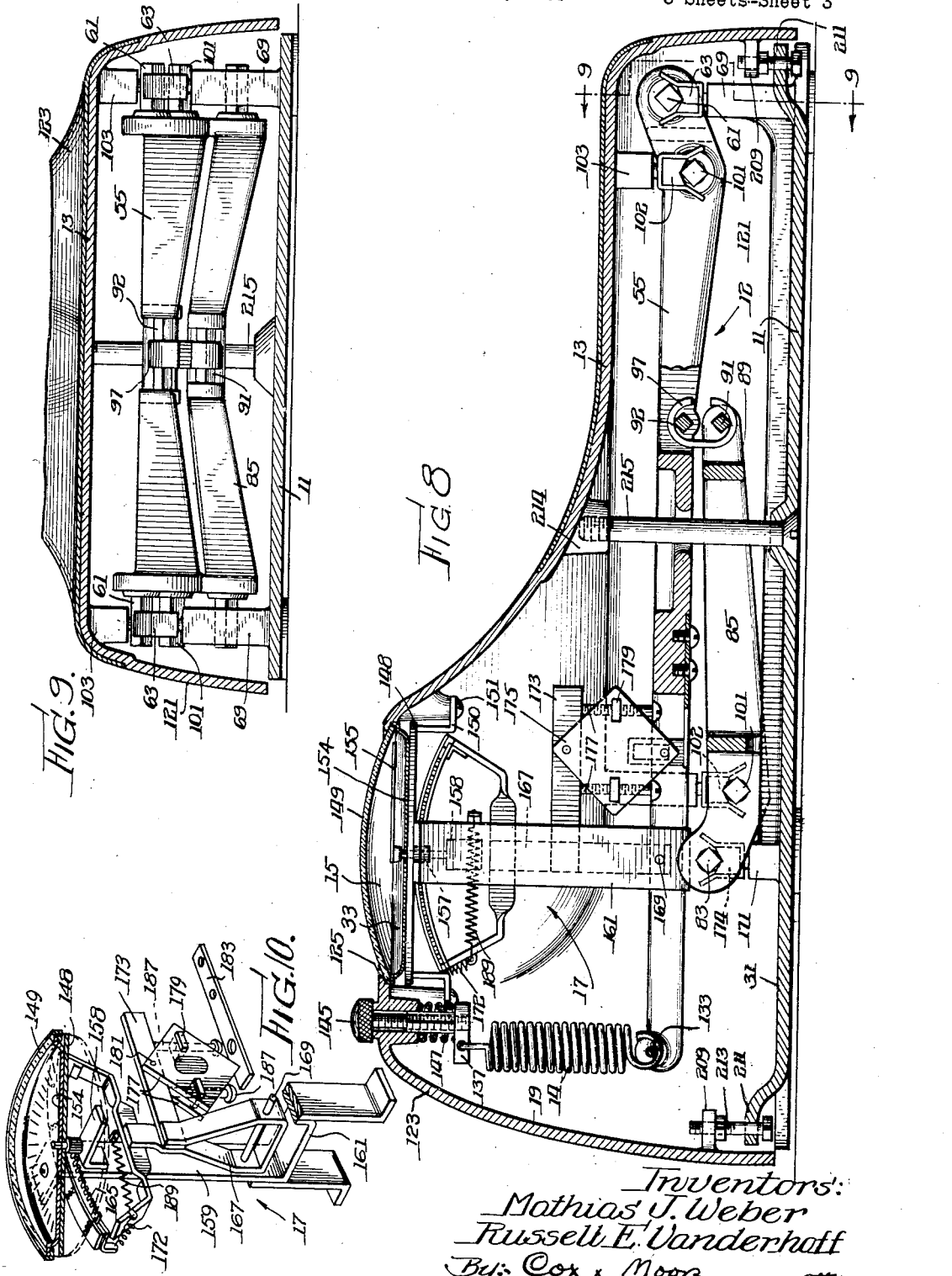
Inventors:
Mathias J. Weber
Russell E. Vanderhoff
By: Cox & Moor
attys.

Patented Oct. 6, 1936

2,056,546

UNITED STATES PATENT OFFICE 2,056,546

WEIGHING MECHANISM

Mathias J. Weber and Russell E. Vanderhoff, Chicago, Ill., assignors, by mesne assignments, to Continental Scale Works, Chicago, Ill., a corporation of Illinois Application December 15, 1933, Serial No. 702,474

14 Claims. (Cl. 265—68)

Our invention relates in general to weighing scales and has more particular reference to a scale having a weight-carrying platform close to the floor, whereby to facilitate use of the scale for personal weighing purposes.

It is an important object of our invention to provide a scale of inexpensive construction and having great space efficiency as a result of the novel and compact arrangement of its parts, said arrangement permitting the scale to be housed in an attractive streamlined casing.

Another important object is to provide a scale having a compact stream-line external appearance which is accomplished among other things by reducing the size of the weight-indicating dial without however reducing the spacement between the graduations of the dial.

Another important object is to provide a scale construction, which can be easily assembled and adjusted after assembly, a further object being to fabricate the indicator and its actuating mechanism as a unit adapted to be assembled as such in the weighing scale.

Another important object of the invention is to provide a weighing scale including a dial of the continuous or circular type, the maximum weight indication of which is less than the maximum capacity of the scale so that the indicator may rotate more than once in measuring a weight within the capacity of the scale.

Another important object is to provide a weighing scale having a repeating, that is to say, a continuous or circular dial which indicates weight units from zero to a convenient maximum, such as one hundred units of weight, and another simultaneously operated indicator graduated to indicate weight units comprising multiples of the maximum weight-indicating unit of the first scale.

Another object is to provide a weighing scale having a repeating indicator graduated to indicate weight units within a limited range and an additional dial indicator graduated in units of weight comprising multiples of the maximum weight indicator on the first named dial; a further object being to graduate the repeating indicator in weight units from zero to a decimal number such as one hundred, the maximum graduation coinciding with the zero graduation, and a second scale graduated in unit multiples of one hundred; a further object being to form the additional indicator as a register of the odometer type; a still further object being to form the additional indicator as a pointer geared to the driving mechanism of the repeating indicator and positioned to co-operate with a suitable scale.

Another object is to provide a weighing scale having a continuous or circular indicator dial of relatively small diametral size and relatively large graduation spacement.

Another important object is to provide a weighing scale adapted to measure weight against the extension of a spring having means to regulate the spring tension comprising an eccentric spring-adjusting element.

Another object is to provide a weighing scale having a weighing mechanism and weight-indicating means co-operatively associated with the weighing mechanism, said weight-indicating means being actuated by the weighing mechanism through the intermediary of a shock absorber of novel construction, a further object being to form said shock absorber as a simple leaf spring through which weight-indicating movement is transmitted to the indicating means from the weighing mechanism.

Another object is to provide a weighing scale having a weighing mechanism and weight-indicating means cooperatively associated with the weighing mechanism, said weight-indicating means having adjustable point connection with the weighing mechanism in order to permit the indicator to be adjusted for accurate indication throughout the operating range of the scale.

Another object is to provide a weighing scale having a weighing mechanism and weight-indicating means cooperatively associated with the weighing mechanism, said weighing mechanism comprising a weight-receiving platform formed as a housing enclosing both the weighing mechanism and the weight-indicating means, and said weighing mechanism being supported on a frame or base which is enclosed by the housing, a further object being to mount the indicating means on the platform.

Another important object of the invention resides in building as a unit, an indicator and its actuating mechanism for a weighing scale of the character mentioned, whereby the indicator and its actuating mechanism may be assembled as a unit in the scale by simply fastening it in place therein, a further object being to form the indicator and its actuating mechanism as a unit for assembly either on the stationary housing of a scale having a separate weighing platform depressible on said housing, or in a scale wherein the scale platform is formed as a unitary part of a housing shiftable on an enclosed stationary base.

Numerous other objects and advantages of the invention will be apparent from the following description, which, taken in connection with the accompanying drawings, discloses preferred embodiments of the invention.

Referring to the drawings:

Figure 1 is a perspective view of a device embodying our present invention, including a main indicator of continuous or circular character and graduated to indicate weight units from zero to a convenient maximum illustrated as one-hundred and an additional indicator, in odometer form, for indicating multiples of the maximum weight indication of the continuous or circular indicator.

Figure 2 is a view in vertical section taken substantially along the line 2—2 in Figure 1;

Figure 3 is a view in horizontal section taken substantially along the line 3—3 in Figure 2;

Figure 4 is a view in horizontal section taken substantially along the line 4—4 in Figure 2;

Figure 5 is a view in vertical section taken substantially along the line 5—5 in Figure 4;

Figure 6 is a perspective view illustrating the indicator actuating mechanism forming a part of the weighing scale.

Figure 7 is a top plan view of the dial of the scale illustrating a modified construction of the additional or multiple weight indicator;

Figures 8 and 9 illustrate a modified arrangement of the scale wherein the weight-receiving platform is formed as an enclosing housing for the weighing and indicator-actuating mechanisms, Figure 8 being a view of the modified device in longitudinal section similar to Figure 2, and Figure 9 being a view in vertical section taken substantially along the line 9—9 in Figure 8;

Figure 10 shows a modified arrangement of the indicator actuating mechanism as mounted in a scale of the character shown in Figures 8 and 9.

To illustrate our invention, we have shown on the drawings, scales of the relatively low platform type comprising means forming a base 11, in which is mounted weighing mechanism comprising a train of levers 12, a weighing platform 13 carried by the levers and yielding means, preferably a helical spring 14, connected to the train of levers whereby a weight on the platform may be measured against the deflection of the yielding means.

The scale also includes a weight indicator 15 and indicator actuating mechanism 17 co-operatively associated with the train of levers 12 and adapted to be shifted thereby in order to actuate the indicator 15 when a weight to be measured is on the platform 13. The indicator means 15, in the embodiment shown in Figures 1 through 7, is mounted on the base 11, which is formed as a casing for enclosing the train of levers and the indicator-actuating mechanism 17, said casing being formed with an opening for receiving the platform 13 in its upper portions. In the modified form shown in Figures 8 and 9, the base 11 is formed simply as a mounting for the train of levers 12 while the weight-receiving platform 13 is extended to form an enclosing housing 19 comprising an upwardly facing portion, a part of which forms the weight-receiving platform and a part of which is formed to receive the indicator means 15. The housing 19 has depending sides, the lower edges of which extend close to the floor, preferably overlappingly coinciding with the edges of the base 11, which may be formed as a plate so that the weighing mechanism and indicator-actuating means 17 is enclosed by and between the housing 19 and the base 11.

In the form shown in Figures 1 through 7, the base 11 is preferably formed as a casting comprising shell-like peripheral walls 21, which, in the forward portions of the scale, define an upwardly facing opening, and which, in the rearward portions of the scale, are extended upwardly to form a dome 23 adapted to receive the indicator mechanism 17, said dome having an upwardly facing preferably circular opening 25 forming an inwardly facing seat for receiving the indicator 15. The dome 23, as shown in Figure 3, has a preferably elliptical configuration, the longitudinal axis of the ellipse coinciding with the longitudinal central line of the casing with the forward portions of the dome sloping downwardly to form a ridge 27 coincident with the central line of the casing. The platform 13 may be formed as a casting or a reinforced sheet metal stamping if desired and is preferably formed with depending side edges forming flanges in position to register with the upper edges of the forward side wall portions of the base. The rearward portions of the platform 13 are formed to continue the contour of the dome 23 having a substantially V-shape notch to receive the forward portions of the ridge 27, the platform also being formed with a vestigial ridge 29 in alignment with and forming a continuation of the ridge 27. The rearmost portions of the platform 13 extend rearwardly on opposite sides of the dome 23 and the platform, the dome and the base are configurated to provide a substantially stream-line appearance.

In the modified construction shown in Figures 8 and 9, the base 11 is preferably formed as a casting comprising a support plate 31 while the casing 19 is formed preferably as a drawn sheet-metal shell having depending side walls 121, the lower edges of which overlap and coincide with the peripheral edges of the plate 31. The shell 19 includes upwardly facing surfaces, the forward portions of which are formed to provide the weight-receiving platform 13 while the rearward portions are arranged to form a dome 123, corresponding with the dome-like portion 23 of the construction shown in Figures 1 through 7, which dome is formed with an upwardly-facing opening 125, preferably circular and centrally aligned in the casing, forming an inwardly facing seat for receiving the indicator means 15. The dome 123, the platform 13, and the side walls 121 are or may be formed to provide a stream-line appearance, similar to that of the construction shown in Figures 1 through 7, with the side walls and platform surfaces flowing into the surfaces of the dome.

In order to provide the attractive stream-line appearance, which is an important feature of both forms of scale illustrated in the drawings and in order to conserve space, we form the indicator 15 preferably as a circular dial which is graduated in weight units from zero to a convenient maximum, such as one hundred when the scale is arranged to measure weight in pounds, with the maximum graduation coinciding with the zero graduation so that the indicator constitutes a continuous or repeating device in which weights higher than those within the graduated range of the dial may be indicated on the dial by the repeating operation of the indicator.

In this way, it is possible to utilize a relatively small dial without reducing the spacement between graduations. The legibility of the indicator is thus preserved intact and the same is easy to read in spite of the reduction in its size. By reducing the size of the indicator, we are not only able to stream-line the casing and produce a neat and attractive scale, but can use an indicator hand or pointer of light flimsy material without appreciable inertia. In addition, the elimination of inertia enables the indicator-actuating mechanism to be made relatively light, flimsy, and consequently cheap without danger of damage in use.

In measuring personal weight, if the person weighs less than the maximum graduated amount shown on the dial, the dial will indicate the weight directly while if the weight of the person is in excess of the weight indicated by the maximum graduation, the indicator will show a weight to which a multiple of the weight of the maximum graduation must be added in order to give the true weight. By graduating the dial so that its maximum graduation is a decimal unit, such as one hundred weight units, it is only necessary to add one hundred units to the weight indicated on the dial in order to obtain the true weight. Where the dial is graduated in pounds, as is usual in personal weight scales, it is safe to assume that the weight of a person will be known within one hundred pounds so that it is only necessary to note the dial reading in order to determine the weight accurately.

It is, therefore, not necessary, as a practical matter, to form a personal weight scale with other than the single circular dial but, in order to provide a complete indicator, we contemplate the provision of additional indicating means, shown in Figures 1 through 6 as an odometer type of indicator 35, and in Figure 7 as an oscillating pointer 197, said additional indicating means being driven simultaneously and synchronously with the main indicator in order to indicate the number of times the main indicator has traveled through its indicating cycle in reaching a weight-indicating position, that is to say, to indicate the amount to be added to the indication of the main dial in order to give true weight.

Alternately, as shown at 203, the zero and maximum graduation may be labeled directly with the maximum weight and multiples thereof, in order to call attention to the fact that the actual weight may be the indicated weight plus a multiple of the maximum weight graduation.

Where the main dial is graduated from zero to one-hundred units, the auxiliary indicators 35 and 135 may be graduated to indicate, as units, multiples of the maximum weight indication on the main dial, that is to say, one hundred, two hundred, three hundred, etc., weight units. In this way, it is possible to provide a relatively small compact indicator without reducing the spacement between the graduations of the main dial as would be necessary if the main dial was graduated to include all of the weights within the entire measuring range of the scale.

As a comparative matter, where the scale is designed to measure up to three-hundred pound weight units, the device of our present invention enables the use of an indicator one-third as large as that necessary if the main scale is graduated to register from zero to three-hundred pound weight units, without changing the spacement or legibility of the graduations of the main dial.

Any suitable train of levers 12 may be employed, the illustrated embodiment including a relatively elongated member 55, having a portion 57 extending into the rearmost portions of the casing beneath the dome 23 and having forked arms 59 extending to the forward corners of the frame 11 and provided with knife edges 61 whereby to tiltably support the member 55 on the frame and enable the portions 57 to move in a vertical plane. The knife edges 61 rest in saddle members 63 having shanks 64 threaded into supports formed on the frame 11.

In the embodiment shown in Figures 1 through 7 these stirrup supports comprise flanges 67 formed on the inner surfaces of the side walls 21 while in the form shown in Figures 8 and 9, the supports are formed as pedestal members 69 extending upwardly from the bottom plate 31. By adjusting the threaded connection of the stirrup members 63 in the stirrup supports, the same may be raised or lowered in the frame and thus enables the alignment of the knife edges 61. The frame 11 is also, on its opposite sides, provided with support means, 71 in the form shown in Figures 1, 2, 4, and 5, and, 171, in the form shown in Figures 8 and 9, for tiltingly carrying a lever 85 forming a part of the system 12. In the form shown in Figures 1, 2, 4, and 5, the supports 71 comprise saddles 73 on which swinging members 75 are tiltingly carried. The members 75 are provided with openings 79 and flanged portions 81, forming seats in said members 75, said seats being adapted to receive knife edges 83, formed at the terminal ends of the arms 87 of the lever member 85.

In the embodiment shown in Figures 8 and 9, of the drawings, the support 171 carries saddle members 174 threaded therein in a fashion similar to that employed at the forward end of the scale. These saddle members 174 carry the knife edges 83 of the lever 85. The forward end 89 of the lever 85 underlies the lever 55 at a point where the arms 59 of said lever are connected together. The lever 85 carries a downwardly facing knife edge 91 and the lever 55 carries an upwardly facing knife edge 95 opposite the knife edge 91. The two knife edges are connected together by means of a stirrup link 97. The weight-carrying platform 13 is provided with depending legs 103 which may be formed integrally thereon as by casting where the platform is a casting, or may be welded or otherwise secured where the platform is a stamping. If desired, the legs may comprise sheet metal strips. These depending legs 103 are disposed in position adjacent the ends of the arms 59 of the main lever 55 and the arms 87 of the auxiliary lever 85. The legs 103 comprise pedestals threadingly carrying adjustable saddle members 102, whereby an added adjustment between the platform and the lever system may be accomplished.

In the embodiment illustrated in Figures 1, 2, and 5, the legs 103 are formed directly with notches 107 for receiving the knife edge portions 101. Obviously, the legs 103 may be arranged in any suitable or convenient manner, and may, in the form shown in Figures 1, 2, and 5, be provided with adjustable saddles in the manner shown in the embodiment illustrated in Figures 8 and 9. In order to prevent the platform 13 from being accidentally dismounted from the structure as shown in Figures 1, 3, and 5, the platform may be provided with a threaded boss, 109, at its forward portions. The casing wall 21 in the vicinity of said boss is provided with a corresponding lug or flange 113 and a threaded member 111 threaded into the boss extends through an opening in said lug and carries a washer adapted to engage the lug and hold the forward portions of the platform against removal from the frame. It will be noted that the rearmost portions of the platform underlie the forward edge of the dome 23 so that these portions of the platform also are prevented from vertical displacement from the lever train. In order to firmly lock the platform on the scale, as for instance during transportation, the platform is provided with an additional boss 114 on its under side in position to threadingly receive the end of a locking screw 115, which extends through an opening 117 in the lever 55. By snugly screwing the platform and the train of levers together, the same may be locked against movement in the casing and in order to condition the same for operation, it is only necessary to remove and discard the locking screw 115.

In the form shown in Figures 8 and 9, the casing 19 is retained in place on the base plate 31 in any suitable or convenient fashion as by forming suitable lugs or bosses 209 on the opposite front and rear walls of the casing and by forming the base plate 31 with offset portions 211 beneath the lugs 209. Holding members 213, preferably threadedly secured in the bosses 209, pass loosely through the portion 211 in order to limit the upward movement of the casing 19 with respect to the base plate 31. In order to firmly lock the casing 19 against relative movement with respect to the base plate 31, as for instance during transportation, the casing is provided with a threaded boss 214 on its underside in position to threadingly engage the end of a locking screw 215 which extends through a suitable opening in the lever 55 and has a head seating in a countersunk depression formed in the base plate 11 so that by snugly securing the base plate and casing 19 together, the same may be locked against movement and the weighing mechanism loaded to extend the spring 14 so that the levers 55 and 85 will be held resiliently on the saddles 63, 102, and 174, and prevented from rattling within the shell. When it is desired to condition the scale for operation, it is simply necessary to remove and discard the fastening member 215.

When a weight to be measured is applied to the platform 13, the end 57 of the lever 55 will be moved downwardly, said downward movement being resisted by the resilient weighing spring 14, the lower end of which is connected to a pin 133 which is mounted between the forked ends of the lever. The upper end of the spring is secured to an adjusting member 137 preferably comprising a non-circular shank 139 easily slidable in a corresponding non-circular bushing 141 formed in the dome of the casing. The shank 139 has a threaded bore adapted to receive the correspondingly threaded shaft of an adjusting screw 143, the upper end of which screw is provided with a preferably knurled adjusting head 145 which is exposed on the outer upper surface of the dome in convenient position to be manipulated from outside of the casing in order to adjust the spring 14. We also prefer to provide a tension spring 147 between the lower end of the bushing 141 and the lower end of the non-circular shank 139. The lower end of the shank carries a radially extending arm to which the upper end of the spring 14 is connected so that tension of the spring is applied to the adjusting member at a point eccentric from the sliding axis of the non-circular member 139. The shank 139, because of the eccentric pull imparted on the arm 131 by the spring 14, is maintained tilted and snugly engaged in the bushing 141 to eliminate lost motion in the adjusting screw.

The movement of the lever 55 against the resistance of the spring 14 is proportional to the weight resting on the platform and this movement being transferred to the weight registering dials by means of the mechanism 17 provides for indicating on the dial the weight applied to the platform.

Any desired or preferred form of continuous or repeating indicator may be employed but we prefer an indicator comprising a substantially platelike dial carrying a circular card 33 graduated with suitable weight units around its periphery, although it is obvious that a continuous dial, drum type or other weight-indicating device may be employed.

The dial is preferably formed as a sheet-metal saucer 154 carrying a transparent, preferably glass cover plate 149, the edges of the plate 149 being received in the formed edges of the saucer and both the saucer and the cover plate 149 being secured in the downwardly facing seat provided by the opening 25 in the dome as by means of the holding lugs 150, mounted as by set screws 151 on suitable bosses 153 formed on the inner surfaces of the dome adjacent the opening 25. The free ends of the holding members 150 extend beneath a holding plate 148 underlying the dial saucer and bracing it in place within the dial seat. The indicator includes a pointer 155 carried on a stub shaft 156 which extends upwardly preferably centrally of the saucer and the graduated dial card. The pointer has a tip adapted to sweep around the edges of the card adjacent the weight graduations thereof. The lower end of the stub shaft 156 extends through the bottom of the saucer 154 and through the holding plate 148, being preferably journaled in said plate, and carries a pinion 157. The lower end of the stub shaft may be journalled in a suitable member 158 comprising a connector bar extending between and fastened to the spaced arms 159 of a substantially U-shaped bracket 161, the upper ends of which comprise outwardly extending flanges 163 which are or may be fastened to the holding plate 148 on opposite sides of the stub shaft. The indicator-actuating mechanism 17 includes a rack 165 which drivingly engages the pinion 157, the rack being carried on a lever member 167, the lower end of which is pivoted on a bar 169 extending between and carried by the spaced arms 159 of the bracket 161.

The rack 165 comprises a relatively thin sheet-metal element pivotally fastened at one end to an arm of the lever member 167, the opposite end of the rack member being yieldably connected as by a spring 172 to another arm of the lever 167. The spring 172 urges the rack normally on the lever in a direction causing engagement between the rack teeth and the pinion 157. The lever member 167 comprises a strip, to the upper end of which the rack-carrying arms are attached, the lower end of the strip being formed as a relatively wide loop, as shown in Figure 6, the sides of which loop are perforated to pivotally receive the bar 169. The member 167 also includes a horizontal arm 173 extending above and substantially parallel to the rearmost portions of the lever 55.

The arm 173 has an adjusting device or fitting 175 comprising a pair of spaced plates 177, which are connected together by means of spacing blocks 179, the plates 177 being preferably square and have upper corners extending on opposite sides of the arm 173 and pivoted thereto by means of the pin 181. The corners of the plates, diagonally opposite to the pivoted corners, are hardened as by heat treatment and bear upon a leaf spring 183 fastened to the lever 55 as by means of the set screws 185. The spring 183 forms a shock absorber and prevents sudden jars, imparted to the lever 55 as by sudden application of a weight on the platform 13, from being transmitted to the more delicate indicator actuating mechanism 17. The blocks 179 are located at the corners of the plates 177 intermediate the pivoted and hardened corners and these blocks carry adjusting screws 187 threaded through the blocks with their upper ends bearing up on the lower edge of the arm 173 on opposite sides of the pivot pin 181 so that by tightening one screw and loosening the other, the angularity of the fitting 175, with respect to the arm 173, may be adjusted. The spring 183, which underlies at least one of the adjusting screws, may be perforated beneath said screw to permit the introduction of an adjusting device such as the tip of a screw driver therethrough in order to manipulate the adusting screw. By altering the angularity of the plates 177 with respect to the arm 173, the distance between the hardened tips of said plates and the pivot 169, about which the rack carrying member 167 is tiltable, may be adjusted. The distance between the tips of the plates 177 and the pivot 169 measures the effective length of an arm of the indicator actuating bell crank and by varying the same, the movement imparted to the indicator in proportion to the movement of the lever 55 may be varied in order to calibrate the indicator mechanism.

When a weight to be measured is applied to the platform 13, the lever 55 will be depressed against the tension of the spring 14. This will cause the spring 183 to fall away under the hardened tips of the plates 177. The weight of these plates 177 together with the weight of the arms 173 will ordinarily cause the member 167 to rotate on its pivot 169 and thus cause the rack to actuate the pointer. However, we prefer to provide a spring 189 extending between one of the rack-carrying arms of the member 167 and one of the legs 159 of the bracket on which the indicator-actuating mechanism is mounted. This spring 189 constantly urges the rack-carrying member 167 in a clockwise direction, viewing Figures 2 and 8, and causes the rack-carrying member to follow the lever 55 when the same moves downwardly under the influence of a weight applied on the platform. The movement of the pointer indicates the weight on the indicator. Obviously, the graduated dial may be mounted on the shaft 156 in place of the indicator 155 and the measured weight indicated on the rotatable dial by means of a stationary pointer.

It will be noted that the indicator-actuating mechanism 17, as well as the dial and the dial housing are all mounted on the bracket 161 and hence may be assembled as a unit which may be mounted as such in the housing merely by inserting the unit in place and securing the same by means of fastening members 150. In the form shown in Figures 8 and 9, the indicator and its actuating mechanism may be mounted on the frame 11 instead of being mounted on the casing 19. This may be accomplished, as indicated in Figure 10, by eliminating the holding brackets 150 and by forming downwardly extending legs on the bracket 161, which downwardly-extending legs may be secured on the base plate 31 between the spaced support portions 171. With such an arrangement, the dial will be exposed slightly below the opening 125 in order to permit the casing 19 to move downwardly with respect to the dial when a weight is applied on the platform. The downward movement of the casing, however, is so slight that the clearance required need not be in excess of one-eighth of an inch for which reason the dial need not at any time be depressed below the opening to a degree hindering the reading of the dial. It is preferable, however, to mount the dial on the casing 19, as shown in Figures 8 and 9.

In order to accommodate the frame 161, carrying the dial actuating mechanism in line with the lever 55, the rearmost portion of the lever is formed with an opening through which the frame 161 may extend without hindering the movement of the lever 55 in a vertical plane.

The auxiliary indicator may be formed by providing an opening in the dial 33 adjacent the opening through which the stub shaft 156 extends and the rack 165 may be formed to carry a scale 193 so that as the rack moves in rotating the stub shaft, suitable indicia graduated on the scale 193 will be exposed in the dial opening. During the rotation of the shaft 156 from zero to the maximum graduation on the dial 33, the numeral "0" will be displayed in the dial opening. After the shaft 156 has made one revolution, and until it has completed its second revolution, the indicia corresponding to the maximum graduation of the main dial will be displayed in the dial opening. When the shaft 156 has completed its second revolution and until it completes its third revolution, indicia representing twice the maximum weight graduation of the main dial will be displayed in the dial opening.

In Figure 7 of the drawings, we have shown a modified construction for indicating multiples of the maximum weight graduation of the main dial. To this end, a stub shaft 195 having one end extending upwardly of the main dial and carrying a pointer 197 in position to sweep over a portion of said main dial, extends through an opening in the dial and is journalled in the plate 148 and in the cross-bar 158, said stub shaft 195 carrying a segmental gear 199 in position to mesh with the pinion 157. An auxiliary dial 201 having graduated units comprising multiples of the maximum weight unit on the main dial is arranged in position beneath the pointer 197 so that as the main indicator is actuated, the auxiliary indicator 135 will be simultaneously actuated to indicate the number of times the shaft 156 is rotated in reaching its weight-indicating position. Obviously, any suitable arrangement for actuating the auxiliary indicator may be utilized. The auxiliary indicator, moreover, may be arranged in any desired form or construction, the important function of the auxiliary indicator being to enable the main dial to be made relatively small without having to reduce the spacement between graduations.

It is thought that the invention and numerous of its attendant advantages will be understood from the foregoing description and it is obvious that numerous changes may be made in the form, construction, and arrangement of the several parts without departing from the spirit or scope of our invention or sacrificing any of its attendant advantages; the forms herein described being preferred embodiments for the purpose of illustrating our invention.

Having thus described our invention, what we claim as new and desire to secure by Letters Patent is as follows:

1. A weighing scale comprising a frame, weighing mechanism comprising a lever tiltable in said frame in response to the application of a weight to be measured on said scale, yielding means operatively associated with said lever for resisting the tilting movement thereof in one direction, and means to adjust said yielding means comprising an adjustable stem mounted for axial movement in said frame, and means connecting said resilient means to said adjustable stem at a point eccentric with respect to its axis in order to urge said stem into wedging engagement with said frame.

2. A weighing scale comprising a frame, weighing mechanism comprising a lever tiltable in said frame in response to the application of a weight to be measured on said scale, a spring connected to said lever to resist the tilting movement thereof in one direction, and adjusting means for said spring comprising a non-circular shaft mounted for axial movement in said frame, and means connecting the other end of said spring to said shaft at a point spaced from its axis in order to urge said stem into wedging engagement with said frame.

3. A weighing scale comprising a frame, weighing mechanism including a member shiftable on said frame in response to the application of a weight to be measured on said scale, an indicator on said frame, indicator-actuating means including a tiltable element drivingly connected with the indicator, a leaf spring connected to said member and bearing in one direction upon the shiftable element at a distance from its axis of tilting movement whereby to tilt the same on its axis in proportion to the movement of the member.

4. A weighing scale comprising a weighing element yieldingly movable in one direction in the scale in proportion to a weight deposited on the scale, an indicator, and means to actuate the indicator comprising a member shiftable in the scale and having a portion in position to bear upon said weighing element yet movable away from said element, and means yieldingly urging said portion to bear on said element, said weighing element, at the point where the indicator actuating member bears upon it, comprising a shock-absorbing leaf spring.

5. A weighing scale comprising a weighing element yieldingly movable in one direction in the scale in proportion to a weight deposited on the scale, an indicator, and means to actuate the indicator comprising a member shiftable in the scale and having a portion in position to bear upon said weighing element yet movable away from said element, and means yieldingly urging said portion to bear on said element, said weighing element carrying a yielding shock-absorbing element upon which the indicator actuating member bears.

6. A weighing scale comprising a frame, weighing mechanism including a weight receiving platform on said frame and indicator means adjacent the platform, said indicating means comprising a dial having an opening and a co-operating pointer, said dial having a maximum weight-indicating graduation less than the maximum weight-measuring capacity of the scale, and tiltable rack means comprising a curved rack portion movable behind said dial opening in response to a deposition of a weight on said platform, said curved rack portion being drivingly connected to relatively shift the dial and pointer through more than one complete weight-indicating cycle whereby weights in excess of the maximum weight-indicating graduation may be indicated by repeating the indicating cycle of the indicator, said curved rack portion carrying indicia progressively exposable in said dial opening during the indicator driving movement of said tiltable element in order to indicate the successive operating cycles of said indicator.

7. A weighing scale comprising a frame and a weight-receiving platform, weighing mechanism yieldingly movable on the frame in proportion to a weight deposited on the platform and weight-indicating means drivingly connected with said mechanism, said indicating means comprising a circular dial supported on said frame and a rotatable pointer in position to sweep around said dial, said dial having an opening and a series of weight-indicating graduations for showing weights between zero and a predetermined maximum less than the maximum weight measuring capacity of the scale, the maximum weight-indicating graduation of the dial coinciding with the zero graduation and said weighing mechanism comprising a tiltable element having a curved portion movable opposite the dial opening and forming a rack to repeatedly turn the pointer around the dial in measuring weight in excess of the maximum weight-indicating graduation, said curved portion carrying indicia progressively exposable in said opening to indicate the cycle of operation of the pointer whereby to provide a weighing scale having a compact yet readily readable clock dial type of indicator.

8. A weighing scale comprising a frame and a weight-receiving platform, weighing mechanism yieldingly movable on the frame in proportion to a weight deposited on the platform and weight-indicating means drivingly connected with said mechanism said indicating means comprising a continuous dial formed with an opening and graduated to show weights throughout an indicating cycle from zero to a predetermined maximum less than the maximum weighing capacity of the scale, and an associated pointer, said dial and pointer being relatively movable and supported in position to sweep in front of said dial, and said weighing mechanism comprising an element tiltable about an axis behind said dial and having a curved portion in position to move behind said dial opening, said curved portion having the axis of the tiltable element as its center of curvature, and means movable with said tiltable element and operatively connected with the pointer to drive the indicating means through more than one indicating cycle in measuring weights in excess of the maximum weight-indicating graduation of the scale, said curved portion carrying indicia progressively exposable in said opening during the travel of the pointer in order to indicate its cyclic operation.

9. A weighing scale comprising a support frame, weighing mechanism including a weight-receiving platform supported on the frame, indicator means on said frame and comprising a graduated dial having an opening and a co-operating pointer, indicator actuating means including an element tiltable about its axis in response to the movement of the platform under the influence of an applied weight, said tiltable element comprising a curved rack portion having the tiltable axis of the element as its center of curvature, said curved rack portion being operatively connected with the indicator means to relatively shift the dial and pointer through repeated indicated cycles and indicia on said curved rack portion and progressively exposable in the dial opening to indicate the operating cycles of the indicator.

10. A weighing machine comprising a main frame, a weight receiving platform, weighing mechanism on said main frame and carrying said platform, said weighing mechanism including a lever tiltable in response to the deposition of a weight on the platform and a resilient weighing element resisting the tilting movement of said lever, a weight indicator and actuating means therefore formed as an assembly unit for removable assembly in said main frame, said unit comprising an auxiliary frame, a dial on said auxiliary frame having an opening therein, a pointer journalled on said auxiliary frame and movable in front of said dial, a tiltable element on said auxiliary frame and comprising a curved rack portion extending behind said dial opening and carrying indicia, said rack portion having geared connection with said pointer, biasing means normally urging said tiltable element to rotate in one direction on said auxiliary frame, said tiltable element having a bearing arm, and means to mount said assembly unit on the frame with the dial exposed in the upwardly facing direction and the bearing arm in position to engage the tiltable lever of the weighing mechanism under the urge of said biasing means.

11. A weighing machine as set forth in claim 10, wherein the tiltable lever is formed with a yielding bearing portion for engaging the bearing arm of the tiltable element of the assembly unit for shock-absorbing purposes.

12. A weighing machine as set forth in claim 10, including means to adjust the point of contact of the bearing arm on said tiltable lever.

13. A weighing machine comprising a main frame, a weight-receiving platform, weighing mechanism on said main frame and carrying said platform, said weighing mechanism including a lever tiltable in response to the deposition of a weight on the platform and a resilient weighing element resisting the tilting movement of said lever, a weight indicator and actuating means therefor formed as an assembly unit for removable assembly in said main frame, said unit comprising an auxiliary frame, a dial on said auxiliary frame having an opening therein, a pointer journalled on said auxiliary frame and movable in front of said dial, a tiltable element on said auxiliary frame and comprising a curved rack portion extending behind said dial opening and having geared connection with said pointer, biasing means normally urging said tiltable element to rotate in one direction on said auxiliary frame, means to drivingly connect said tiltable element with said lever whereby the same may be shifted in proportion to the movement of the lever in order to operate the indicator through repeated indicating cycles, and indicia on said curved rack portion and progressively exposable in the dial opening to indicate the repeating cycles of said indicator.

14. A weighing machine as set forth in claim 13, wherein said auxiliary frame comprises a U-shaped sheet metal element having a dial supporting plate secured to the arms of said U-shaped element, the dial being secured on said plate, a cross-connection between said arms and spaced from said plate, said pointer being carried on a shaft journalled in said plate and cross-connection, and being formed with a pinion therebetween, said tilting element being carried on a pin extending between and carried at its opposite ends in the arms of the U-shaped frame element with said curved rack element extending between the dial-supporting plate and the cross-connection, said biasing means comprising a spring secured at one end to a lug formed on the tiltable element and at its other end on a lug carried by an arm of said U-shaped element.

MATHIAS J. WEBER.
RUSSELL E. VANDERHOFF.